UNITED STATES PATENT OFFICE.

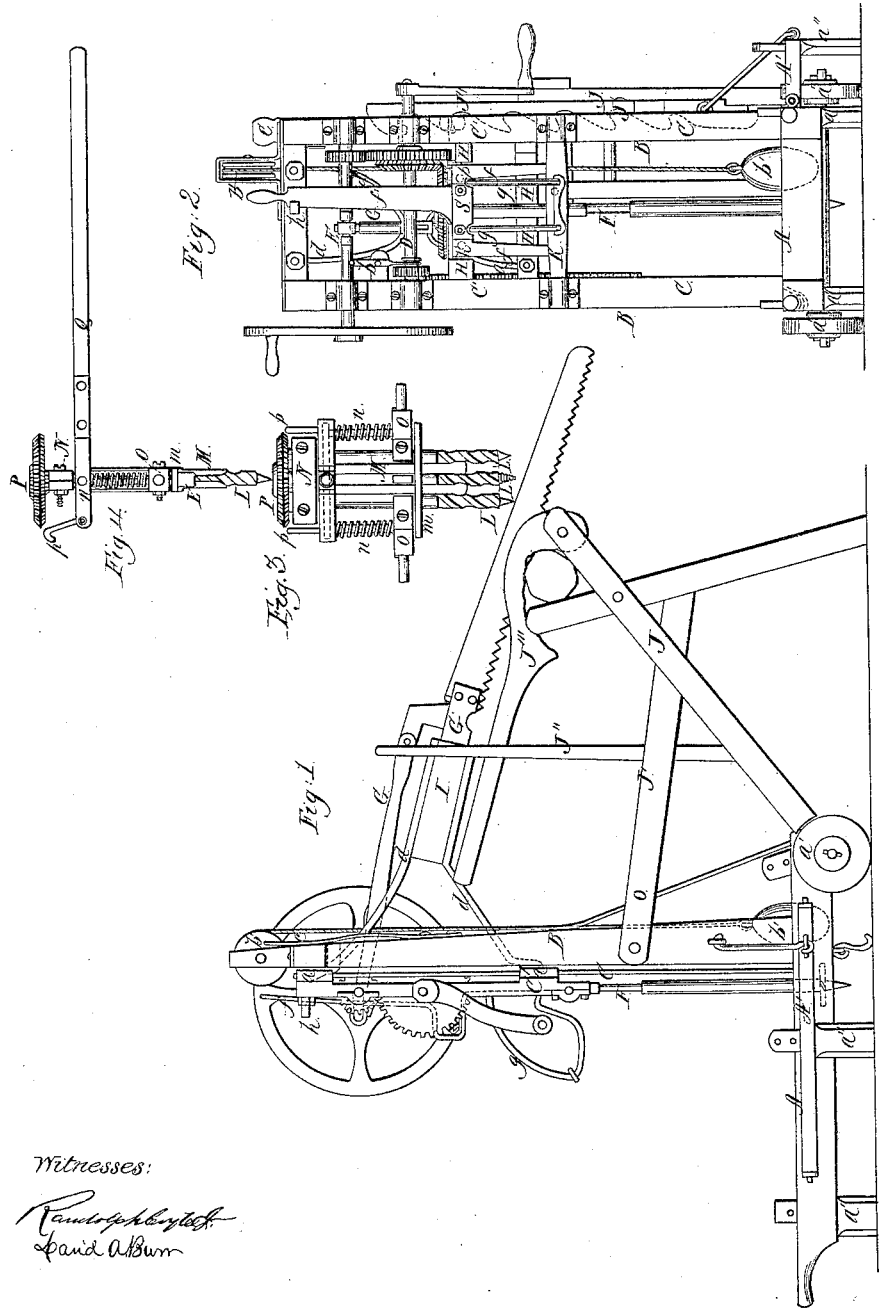

LEVI J. WALLICH, OF KNOXVILLE, ILLINOIS.

IMPROVEMENT IN MACHINES FOR SAWING, BORING, AND MORTISING.

Specification forming part of Letters Patent No. 45,097, dated November 15, 1864.

*To all whom it may concern:*

Be it known that I, L. J. WALLICH, of Knoxville, in the county of Knox and State of Illinois, have invented a new and useful machine for boring and mortising posts, boring post-holes, and sawing, combined; and I do hereby declare that the following is a full, clear, and exact description of the construction and operation of the same, reference being had to the accompanying drawings, making a part of this specification, of which—

Figure 1 is side elevation of my machine; Fig. 2, a front elevation of same; Fig. 3, a front view of my mortising and boring apparatus detached from the machine; Fig. 4, a side view of same.

Like letters in all figures of the drawings indicate corresponding parts.

The nature of my invention consists in the construction of a light portable machine, whereby the functions of sawing, boring, and mortising posts, and boring post-holes are combined, the sawing and boring, or boring and mortising apparatuses being so arranged and adapted to the machine that any two of them, for facility and dispatch, may be worked simultaneously, or by disconnecting the one from the other may be performed separately— as, for instance, while the saw is cutting the post to any desired length the ground-auger is preparing the hole for the same. By removing the latter and attaching the boring and mortising apparatus, the mortises are prepared to receive the fencing-bars, but in order to lighten the labor that would be required in performing two operations any one may be done separately.

To enable others skilled in the art to make and use my invention, I will proceed to describe its construction and operation.

I have a platform or truck, A, whose side timber pieces have handle-shaped ends on the front part of them, with adjustable legs $a'$ $a'$, and wheels $a'$ $a'$ on the back. The legs are tenoned of a sufficient length and project through mortises in the timber pieces and made secure by pins, two or more holes being made on the tenons, so that the platform and its appurtenances may be adapted to uneven surfaces of ground (thereby steadying the machine) by changing the pins from one hole to another. The wheels are made adjustable in the same manner. Secured to the timber pieces of the platform near the back part of them, and properly braced, are longitudinal uprights B B, on the front sides of which are metallic plates C C. The front outside edges of the uprights, between them and the plates, are rabbeted, forming a groove to receive the tongued cleats or clamps $a\ a$ of the gate or frame $C'$, for the purpose of holding and enabling the same to slide in an upward and downward direction.

About the center of the gate is the driving-shaft D, which drives the upper cranked shaft, E, (by means of suitable cog-wheels to the right,) thereby operating the saw when the ratchet-wheel to the left on the driving-shaft is placed in gear, which is done by a movable guide-bar, $b$, above, embracing a flange or ear on the wheel. Joined to the main cog-wheel on the driving-shaft is a beveled one, which drives either the ground augers F, or the wood augers L L L, by means of a horizontal one. By removing the upper cranked shaft to which the saw apparatus is attached, the operation of boring the earth or boring and mortising wood may each be done by itself—that is, the one is disconnected from the other, and by removing the one or the other of the two latter apparatuses the sawing may be done alone, as seen clearly in Fig. 2.

On the crank part of the upper shaft and attached thereto is a rod, G, connecting with an elbow-plate, $G'$, every revolution of the shaft giving a reciprocating motion to the saw, which is kept perfectly steady and true by means of the elbow-plate (to which it is connected) sliding in a box, I, which is of a suitable form and length. This box is secured a little off from the longitudinal uprights by four brace-rods, $d\ d$, extending the entire length of the box on its outer corners, to the upper and lower transverse pieces of the gate or frame, as seen clearly in Fig. 1.

A little to the right of the saw is the wood-horse J, the front legs of it resting on the axle of the adjustable wheels, the back ones on the ground. It is kept steady by a bar, $J'$, secured to and extending from it to the upright, where it is fastened. Secured to this bar and resting on the front leg of the horse is the vertical notched or hooked bar $J''$, the notches being seen in Fig. 2 in dotted lines.

A post or log of wood being placed on the horse, the lever $J'''$, which is secured near the top of the front leg of the horse—that part of it which embraces the post or log of wood being of a curved form and having a corrugated surface underneath to bite, as it were, and take hold of same when borne down, secures the post or log of wood tightly on the horse—the other end of the lever being caught and held in one of the notches. The teeth of the saw standing backward work easy when drawn to the machine, and when driven forward the post or log of wood is made tighter and more secure in the horse than it would otherwise be were the teeth different.

The saw-horse and its appurtances are so constructed that they may be readily removed from the machine, if found desirable in transportation. If the saw works hard by reason of the wood being tough or too soft, or otherwise fatiguing the operator by the descending motion of the gate being too rapid, it is remedied by a weight, $b$, being connected by a cord to one of the rods of the sliding box I and thrown over a pulley, $b'$, on the top of the upright frame, as seen in Figs. 1 and 2, thus relieving the operator and the straining of the saw.

I do not confine myself in the use of the saw to cutting posts, as it may be used in cutting logs and fire-wood; but I prefer to use it in its connection with field-fencing and in its combination with the boring apparatuses.

The ground or post auger F passes through the shaft K, as seen in Fig. 2, and is then secured thereto. This shaft is secured to the lower portion of the gate or frame at its ends by movable bearing-plates. Let in or joined to the top side of it are two bars, $f f$, which extend up as far as the underneath surface of the horizontal cog-wheel on the auger and there connected by two plates, $s s$, being bolted together. It is extended farther by being curved over the wheel, as seen in Fig. 1, and then converges into a spring-bar, $f'$. The auger extends a little below the bottom of the platform, or at such proper distance as may be desired, and when the descending motion is given to the gate by means of the crank-handle to the right, as seen in Fig. 2, the auger is driven down to a sufficient distance in the ground, thus making the hole required for the post. It is then carried upward, the ascending motion being given to the gate by means of the balance-wheel to the left, and whatever dirt there is remaining on the shank of the auger near the point is deposited several inches from the hole by the spring-bar $f'$ being loosened from the catch $h$ and thrown down, bringing the auger to a nearly horizontal position—it may be brought entirely so—so that the saw may be used alone, thus obviating the necessity of a removal of the auger. This spring-bar and its appendages shuts against a transverse bar, H, between the gate-pieces. The peculiar curved-formed guide-rods $g g$ extend from the transverse bar and are secured thereto (to the lower one, H') in such a manner as to admit of their being easily removed. They contribute to steady the auger when brought up or thrown down.

By removing the ground-auger apparatus and the guide-rods, which is done by removing the bearing-plates from the shaft, the boring and mortising apparatus may be attached, as represented in Figs. 3 and 4, which I will now proceed to describe.

I have three augers, L L L, and four chisels, M M M M, suitably arranged in a frame. The augers are placed in a line along side and separated sufficiently as not to touch one another in their revolutions. They are let in and secured to the shaft $o$ (by a bearing plate) at a proper distance from their respective points, and secured above by two plates, N N, bolted together. On the top of the middle auger is a horizontal beveled cog-wheel, P, with inverted cogs underneath, two small wheels of a proportional size in diameter on the tops of the outer ones fitting into them. In order to obviate the difficulty that would be experienced in boring if all three of the augers were screw-pointed, the screw on the center one is retained and the outer ones made smooth like the point of a center bit. Thus, while the center one turns around half as fast as the adjacent ones, the smooth-pointed ones cut only half as fast, thereby equalizing the revolution of the three augers in boring posts or other kinds of timber. On each side are two chisels, M M, each chisel being placed between the center and outer auger, so as to cut out that part of the wood left untouched by the augers. The chisels are secured to the outer edges of a plate, $m$, underneath the shaft, and project a sufficient distance below it to perform the part required of them, and again secured at the upper parts of them by another plate, $n$, (seen in dotted lines in Fig. 3,) in a similar manner. The augers pass through these plates sufficiently loose to admit of an easy upward and downward move. The plates are made secure at their ends by rods, which are surrounded with spiral springs $n n$, for the purpose of giving a proper degree of pressure to the chisels when depressed by the lever Q, which is attached in a proper manner to a forked plate or bar, embracing the pivoted ends of the upper plate, $n$, as seen in dotted lines in Fig. 3. On the ends of the forked bar (to which the lever is secured) are hooks $p p$. They are inserted in the holes $p' p'$, through the transverse bar H (seen in dotted lines in Fig. 2) on the attachment of the apparatus, and serve to give a bearing to that part of the lever in its connection with the transverse bar in a downward pressure, the chisels cleaning and mortising out in an effectual manner the parts untouched by the augers. If the augers work hard, by a too rapid descending motion of the gate or otherwise the weight may be used to relieve it, as in the case of the saw.

In order that the operator may be kept out of the mud or stand on a firm basis, a small platform, A', is hinged to the right side of the main one and supported by an adjustable leg, $a''$, and rod hooked to the side of the upright in a proper manner. When not in use, it may be thrown up out of the way, as seen clearly in Fig. 2. On the back of the upright to the right is a spring-catch bar, $c$, which catches the upper transverse bar of the gate underneath and holds it when not in operation.

In the transportation of the machine, by drawing in the bar attached to the wood-horse and replacing the pin in another hole, it will be raised sufficiently from the ground, so that the machine may be wheeled about like a wheel-barrow by taking hold of the handle-shaped ends of the timber pieces of the platform. For lightness, any one or all of the apparatuses may be removed with facility and ease.

Having thus fully described my invention, what I claim, and desire to secure by Letters Patent, is—

In a machine for boring and mortising posts, boring post-holes and sawing, the arrangement of the screw and smooth pointed augers L L L, chisels M M, and lever Q, and the arrangement of the ground-auger F, guides $f\,f$, and spring $f'$, for throwing same up or down, and the arrangement of the notched lever $J''$, bearing-lever $J'''$, wood-horse J, and saw $G'$, in combination with the gate C and frame B, substantially in the manner and for the purposes herein specified.

LEVI J. WALLICH.

Witnesses:
LEVI MASSIE,
JOHN BABINGTON.